(12) United States Patent
Ryu et al.

(10) Patent No.: US 11,235,658 B2
(45) Date of Patent: Feb. 1, 2022

(54) STIFFNESS REINFORCEMENT STRUCTURE FOR FUEL TANK OF VEHICLE

(71) Applicants: HYUNDAI MOTOR COMPANY, Seoul (KR); KIA MOTORS CORPORATION, Seoul (KR)

(72) Inventors: Bu Yeol Ryu, Hwaseong-si (KR); Myeong Hwan Kim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 152 days.

(21) Appl. No.: 16/684,113

(22) Filed: Nov. 14, 2019

(65) Prior Publication Data
US 2021/0016655 A1 Jan. 21, 2021

(30) Foreign Application Priority Data
Jul. 15, 2019 (KR) .......................... 10-2019-0085050

(51) Int. Cl.
*B60K 15/03* (2006.01)

(52) U.S. Cl.
CPC .................. *B60K 15/03006* (2013.01); *B60K 2015/03493* (2013.01)

(58) Field of Classification Search
CPC .............. B60K 15/03006; B60K 15/03; B60K 15/073; B60K 15/067; B60K 2015/03493; B60K 2015/03453

USPC ......................................................... 220/562
See application file for complete search history.

(56) References Cited

U.S. PATENT DOCUMENTS

| | | | | |
|---|---|---|---|---|
| 6,378,903 | B1* | 4/2002 | Yabutsuka | B62D 1/195 188/371 |
| 2014/0197174 | A1* | 7/2014 | Boecker | B60K 15/03177 220/562 |
| 2015/0224871 | A1 | 8/2015 | Boecker et al. | |
| 2016/0193913 | A1* | 7/2016 | Kataoka | B60K 15/03 220/562 |
| 2018/0065475 | A1* | 3/2018 | Amano | B60K 15/03177 |
| 2020/0189384 | A1* | 6/2020 | Lichti | B29C 51/12 |

FOREIGN PATENT DOCUMENTS

| | | |
|---|---|---|
| JP | 5521662 B2 | 2/2014 |
| JP | 6381450 B2 | 8/2018 |
| KR | 10-2013-0085874 A | 7/2013 |
| KR | 10-1582078 B1 | 12/2015 |

* cited by examiner

*Primary Examiner* — Stephen J Castellano
(74) *Attorney, Agent, or Firm* — Lempia Summerfield Katz LLC

(57) ABSTRACT

A stiffness reinforcement structure for a fuel tank of a vehicle is capable of maintaining the stiffness of the fuel tank even with changes in pressure such as positive pressure and negative pressure in the fuel tank. In particular, a stiffness reinforcement column inside a fuel tank made of a plastic material is capable of preventing heat fused portions between the reinforcement column and the upper and lower plates of the fuel tank from being ruptured by allowing the stiffness reinforcement column to have self-reactive impact dispersion movement in case of a vehicle collision accident.

10 Claims, 6 Drawing Sheets

FIG.1 "PRIOR ART"

STIFFNESS REINFORCEMENT STRUCTURE FOR FUEL TANK OF VEHICLE

CROSS REFERENCE TO RELATED APPLICATION

This application claims priority to and the benefit of Korean Patent Application No. 10-2019-0085050, filed Jul. 15, 2019, the entire contents of which are incorporated herein by reference.

FIELD

The present disclosure relates to a stiffness reinforcement structure for a fuel tank of a vehicle.

BACKGROUND

The statements in this section merely provide background information related to the present disclosure and may not constitute prior art.

In general, when a negative pressure of an engine acts on a fuel tank side through a canister while the engine of a gasoline vehicle operates, an evaporation gas in a fuel tank is collected in the canister and the evaporation gas collected in the canister enters into a combustion chamber of the engine by the negative pressure of the engine, thereby being combusted therein, so that the regulation on the evaporation gas emission may be met.

On the other hand, in the case of a hybrid vehicle, when only a traveling motor is operated, a negative pressure of an engine due to an engine operation is not available, so that an evaporation gas in a fuel tank is not collected properly in a canister.

To resolve these drawbacks, the fuel tank of the hybrid vehicle is manufactured in a closed structure using a plastic material, wherein the fuel tank is manufactured in a structure equipped with an electronic solenoid for generating positive pressure and negative pressure.

However, when internal pressure of the fuel tank is increased due to rise of outside air temperature, a problem of deformation of the fuel tank made of the plastic material follows.

Therefore, a separate stiffness reinforcement member for preventing deformation of the fuel tank is desired to be installed in the fuel tank made of the plastic material.

FIG. 1 shows an example of a conventional stiffness reinforcement member provided in a fuel tank.

As shown in FIG. 1, a reinforcement column 20 is connected between an upper plate 11 and a lower plate 12 of a fuel tank 10.

That is, a top surface and a bottom surface of the reinforcement column 20 are integrally fused to the upper plate 11 and the lower plate 12, respectively, of the fuel tank 10 by heat fused method or the like.

Specifically, in order to absorb a shock in an event of a vehicle collision according to safety regulations, the reinforcement column 20 includes a concave rupture inducing portion 22 at the middle portion of the reinforcement column 20.

Therefore, when a large impact due to the vehicle collision is applied to the fuel tank 10 made of the plastic material, the fuel tank 10 is deformed to absorb the impact, and at the same time, the rupture inducing portion 22 of the reinforcement column 20 is deformed or ruptured, absorbing the impact.

However, we have discovered that when the level of stiffness of the reinforcement column 20 is greater than a desired reference value, the rupture inducing portion 22 may not be broken (or deformed) even when the impact due to the vehicle collision is applied to the plastic fuel tank 10. Instead, the fused portion between the upper plate 11 of the tank 10 and the top surface of the reinforcement column 20 or the fused portion between the lower plate 12 of the fuel tank 10 and the bottom surface of the reinforcement column 20 is ruptured (torn), thereby causing a problem that the fuel inside the fuel tank leaks.

We have also found that when the stiffness of the reinforcement column 20 is too weak, the rupture inducing portion 22 is easily broken even by the negative pressure acting on the fuel tank, thereby causing a problem that the fuel tank is excessively deformed.

SUMMARY

The present disclosure provides a stiffness reinforcement structure for a fuel tank of a vehicle, which is capable of maintaining the stiffness of the fuel tank even with changes in pressure such as positive pressure and negative pressure in the fuel tank by mounting a stiffness reinforcement column inside a fuel tank made of a plastic material and capable of inhibiting heat fused portions between the reinforcement column and the upper and lower plates of the fuel tank from being ruptured by allowing the stiffness reinforcement column to have self-reactive impact dispersion movement in case of a vehicle collision accident.

In one form of present disclosure, the stiffness reinforcement structure for the fuel tank of the vehicle may include: a reinforcement column including an upper end part and a lower end part; an upper fusing structure including a first locking structure configured to lock the upper end part of the reinforcement column, thereby the upper fusing structure being fused on an inner top surface of the fuel tank; and a lower fusing structure including a second locking structure configured to lock the lower end part of the reinforcement column, thereby the lower fusing structure being fused on an inner bottom surface of the fuel tank. In particular, the upper end part of the reinforcement column is removably inserted into and locked to the first locking structure of the upper fusing structure, and the lower end part of the reinforcement column is removably inserted into and locked to the second locking structure of the lower fusing structure.

The first locking structure may be integrally provided at a lower side of the upper fusing structure, thereby providing a locking space where the upper end part of the reinforcement column may be inserted in a horizontal direction and may be provided with an opening at one side thereof, thereby allowing the reinforcement column to be accessed when assembled.

A first locking lever may be integrally provided at a part of a periphery of the first locking structure, thereby exerting an elastic restoring force to an original position when opened outward.

One end of the first locking lever may be integrally provided at a predetermined position of the periphery of the first locking structure, and an opposite end thereof may be arranged as a free end in the opening of the first locking structure.

The second locking structure may be integrally provided at an upper side of the lower fusing structure, thereby providing a locking space where the lower end part of the reinforcement column may be inserted in a horizontal direction and may be provided with an opening at one side thereof, thereby allowing the reinforcement column to be accessed when assembled.

A second locking lever may be integrally provided at a part of a periphery of the second locking structure, thereby exerting an elastic restoring force to an original position when opened outward.

One end of the second locking lever may be integrally provided at a predetermined position of the periphery of the second locking structure, and an opposite end thereof may be arranged as a free end in the opening of the second locking structure.

In addition, on a top surface of the upper fusing structure and under a bottom surface of the lower fusing structure, a plurality of heat fusing projections may be integrally provided.

The reinforcement column may include: a column portion having a predetermined length, an upper locking plate integrally provided on an upper end of the column portion and inserted into and locked to the locking space provided in the first locking structure, and a lower locking plate integrally provided on a lower end of the column portion and inserted into and locked to the locking space provided in the second locking structure.

Specifically, a diameter of the upper locking plate may be provided to be smaller than a diameter of the locking space of the first locking structure, and a diameter of the lower locking plate may be provided to be smaller than a diameter of the locking space of the second locking structure.

The column portion of the reinforcement column may form a hollow pipe shape and include a plurality of vanes which are radially arranged around the column portion and integrally provided on an outer surface portion of the column portion.

Alternatively, the column portion of the reinforcement column may be manufactured in a structure having a plurality of grid-shaped cell spaces in an inner portion thereof.

Through above-described structure, the present disclosure provides following effects.

First, the stiffness reinforcement column mounted in the fuel tank can prevent the fuel tank from being deformed in the vertical direction.

Second, even though an impact in such as a vehicle collision accident is applied to the fuel tank and the reinforcement column, the upper and lower locking plates of the reinforcement column move in the locking spaces of the first and second locking structures, respectively, thereby allowing the impact to be dispersed and absorbed. As a result, the heat fused states of the upper and lower fusing structures of the reinforcement column with respect to the upper and lower plates of the fuel tank, respectively, can be maintained as they are.

Third, under a given condition that the impact in such as the vehicle collision accident is applied, the upper and lower fusing structures of the reinforcement column are not ruptured and maintain the state thereof fused on the upper and lower plates of the fuel tank, respectively. Accordingly, it is possible to easily prevent the leakage due to the rupture in the fused portions of the conventional fuel tank.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6A:
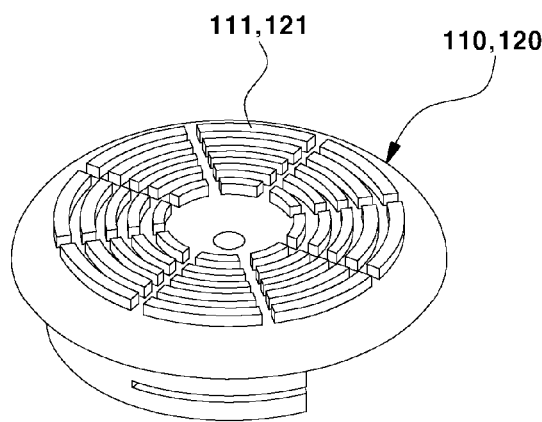
Figure 6B:
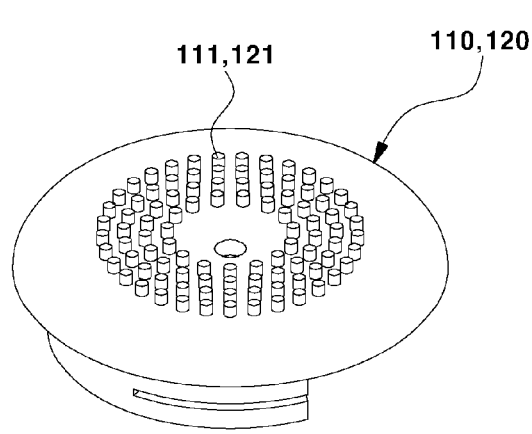
Figure 7A:
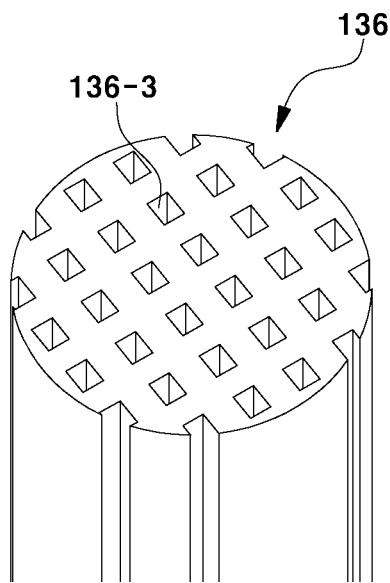
Figure 7B:
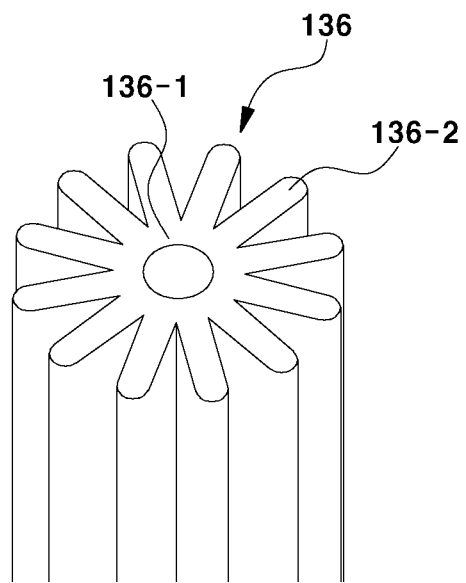

FIGS. 6A and 6B are perspective views respectively showing an example of heat fusing projections provided on the upper and lower fusing structures of the stiffness reinforcement structure for the fuel tank of the vehicle according to one form of the present disclosure; and FIGS. 7A and 7B are views respectively showing an example of the sectional structure of a stiffness column of the stiffness reinforcement structure for the fuel tank in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary embodiments of the present disclosure will be described in detail with reference to the accompanying drawings.

Figure 1:
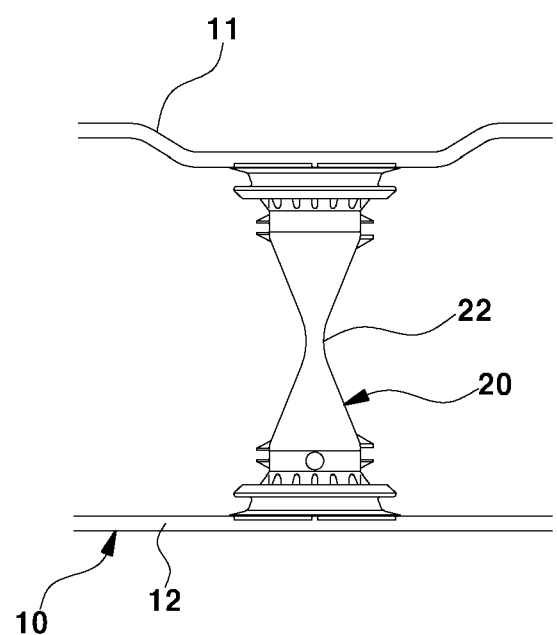
FIG. 1 is a sectional view showing an example of a conventional stiffness reinforcement member provided in a fuel tank.
Figure 2:
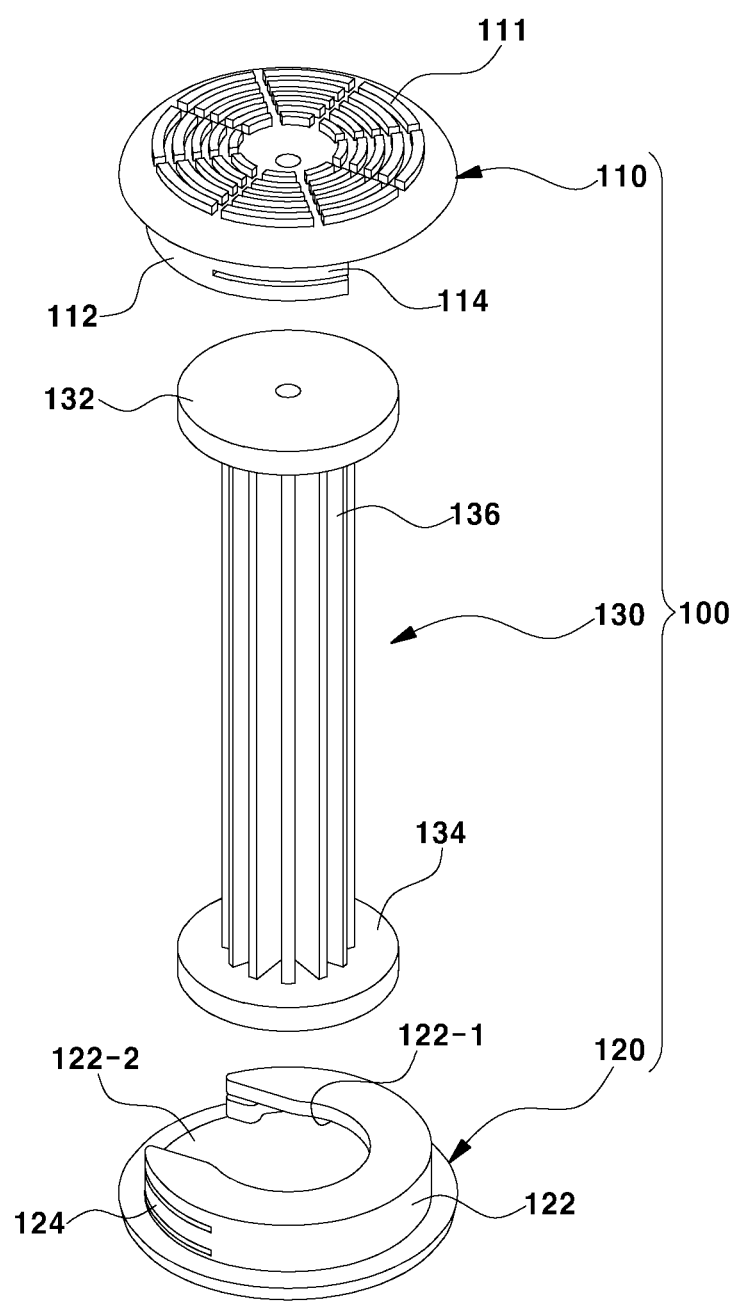
FIG. 2 is an exploded perspective view showing a stiffness reinforcement structure for a fuel tank of a vehicle in one form of the present disclosure.
Figure 3A:
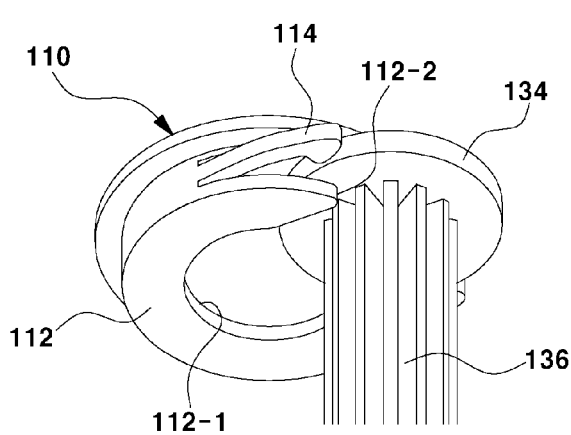
FIGS. 3A and 3B are enlarged perspective views, of major parts, showing a process of assembling the stiffness reinforcement structure for the fuel tank of the vehicle in one form of the present disclosure.
Figure 3B:
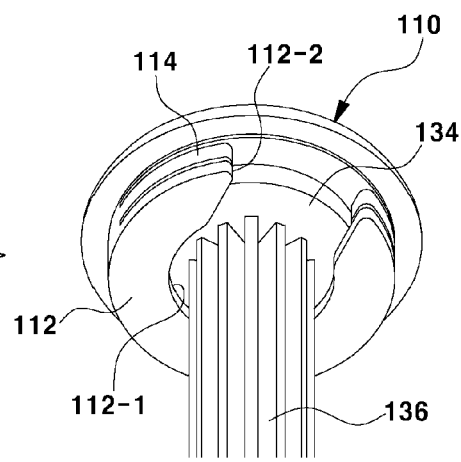
Figure 4:
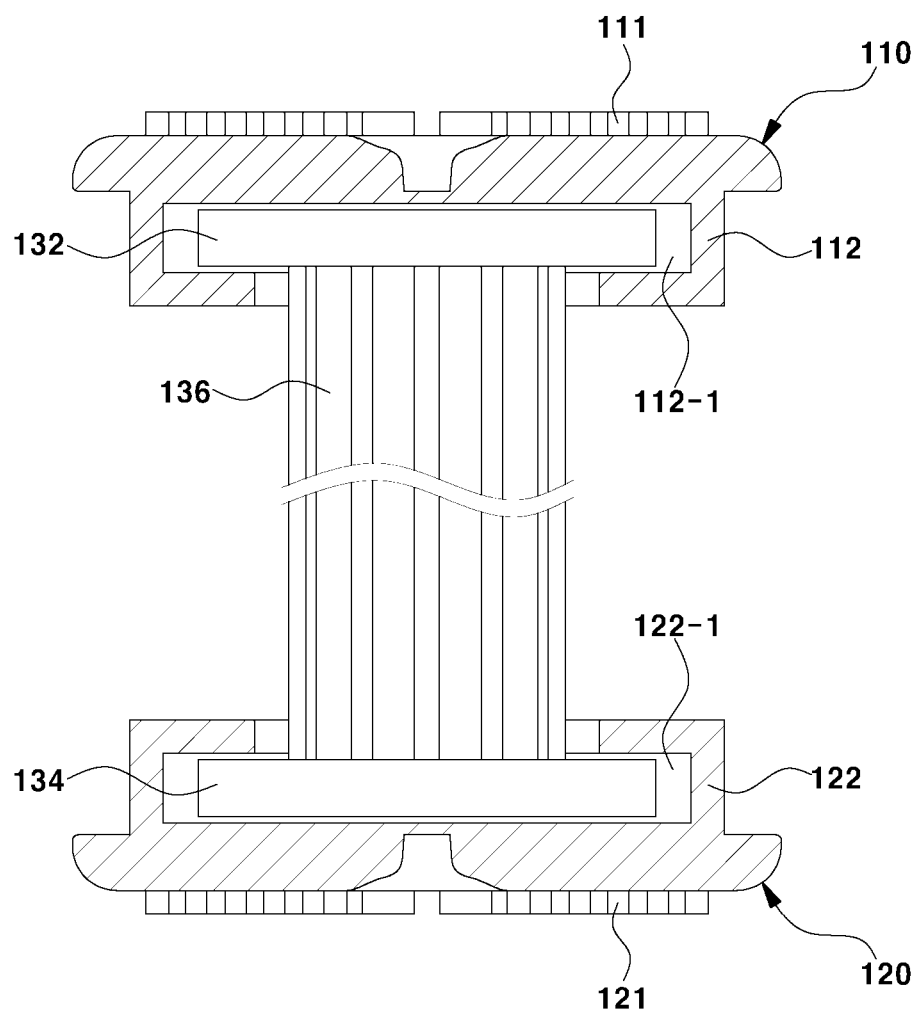
FIG. 4 is a side sectional view showing an assembled state of the stiffness reinforcement structure for the fuel tank of the vehicle in one form of the present disclosure.

Accompanying FIG. 2 is an exploded perspective view showing a stiffness reinforcement structure for a fuel tank of a vehicle in one form of the present disclosure, FIGS. 3A and 3B are enlarged perspective views of major parts, showing a process of assembling the stiffness reinforcement structure for the fuel tank of the vehicle according to one form of the present disclosure, and FIG. 4 is a side sectional view showing an assembled state of the stiffness reinforcement structure for the fuel tank of the vehicle according to one form of the present disclosure.

As shown in FIGS. 2 to 4, the stiffness reinforcement structure 100 for the fuel tank of the vehicle according to one form of the present disclosure includes: an upper fusing structure 110 and a lower fusing structure 120, which have the same shape and a symmetrical mounting structure, and a reinforcement column 130 connected and assembled between the upper fusing structure 110 and the lower fusing structure 120.

The upper fusing structure 110 has a disk-like shape and is manufactured in a structure where a plurality of heat fusing projections 111, to be heat fused to the inner ceiling surface (namely, an inner top surface) of the fuel tank 200, is integrally provided on a top surface thereof, and a first locking structure 112, for locking an upper end part of the reinforcement column 130, is integrally provided at a lower side thereof.

In this case, the heat fusing projections 111 provided on the top surface of the upper fusing structure 110 may have various shapes such as circular, rectilinear, and arc-like shapes and the like as shown in FIGS. 6A and 6B.

Specifically, the first locking structure 112 is integrally provided at a lower side of the upper fusing structure 110 while being provided with a locking space 112-1, having an L-shaped boundary surface, which an upper end part of the reinforcement column 130 is inserted into and coupled to in a horizontal direction. In addition, an opening 112-2 is provided at one side of the first locking structure 112, thereby allowing an upper locking plate 132 of the reinforcement column 130 to be accessed when assembled.

In addition, a first locking lever 114 is integrally provided at a part of a periphery of the first locking structure 112, thereby exerting an elastic restoring force to an original position when opened outward.

More specifically, one end of the first locking lever 114 is integrally provided at a predetermined position of the periphery of the first locking structure 112, and an opposite end thereof is arranged as a free end in the opening 112-2 of the first locking structure 112.

Therefore, as shown in FIG. 3A, after the first locking lever 114 is opened outward, the upper locking plate 132 of the reinforcement column 130 is inserted into the locking space 112-1 through the opening 112-2 of the first locking structure 112. Then, as illustrated in FIG. 3B, when the first locking lever 114 is released, the first locking lever 114 is returned to an original position thereof by the elastic restoring force. Consequently, the upper locking plate 132 of the reinforcement column 130 enters a locked state, in a state of being inserted into the locking space 112-1, by the first locking lever 114.

Meanwhile, a lower fusing structure 120 has a disk-like shape the same as the upper fusing structure 110 has and is manufactured such that a plurality of heat fusing projections 121, to be heat fused to the inner bottom surface of the fuel tank 200, is integrally provided under a bottom surface thereof, and a second locking structure 122, for locking a lower end part of the reinforcement column 130, is integrally provided at an upper side thereof.

In this case, the heat fusing projections 121 provided under the bottom surface of the lower fusing structure 120 may have various shapes such as circular, rectilinear, and arc-like shapes and the like as shown in FIGS. 6A and 6B.

In the same manner, the second locking structure 122 is integrally provided on a top surface of the lower fusing structure 120 while being provided with a locking space 122-1, having an L-shaped boundary surface, which the bottom end part of the reinforcement column 130 is inserted into and coupled to in the horizontal direction. In addition, an opening 122-2 is provided at one side of the second locking structure 122, thereby allowing a lower locking plate 134 of the reinforcement column 130 to be accessed when assembled.

In addition, a second locking lever 124 is also integrally provided at a part of the periphery of the second locking structure 122, thereby exerting an elastic restoring force to an original position when opened outward.

More specifically, one end of the second locking lever 124 is integrally provided at a predetermined position of the periphery of the second locking structure 122, and an opposite end thereof is arranged as a free end in the opening 122-2 of the second locking structure 122.

Therefore, after the second locking lever 124 is opened outward, the lower locking plate 134 of the reinforcement column 130 is inserted into the locking space 122-1 through the opening 122-2 of the second locking structure 122. Then, when the second locking lever 124 is released, the second locking lever 124 is returned to an original position thereof by the elastic restoring force. Consequently, the lower locking plate 134 of the reinforcement column 130 enters into a locked state, in a state of being inserted into the locking space 122-1, by the second locking lever 124.

The reinforcement column 130 is vertically arranged inside the fuel tank, wherein the upper end part thereof is removably inserted in to and locked to the first locking structure 112 of the upper fusing structure 110, and the lower end part thereof is removably inserted into and locked to the second locking structure 122 of the lower fusing structure 120.

To this end, the reinforcement column 130 is composed of a column portion 136 having a predetermined length, the disk-shaped upper locking plate 132 integrally provided on an upper end of the column portion 136 and inserted into and locked to the locking space 112-1 provided in the first locking structure 112, and the disk-shaped lower locking plate 134 integrally provided under a lower end of the column portion 136 and inserted into and locked to the locking space 122-1 provided in the second locking structure 122.

Specifically, a diameter of the upper locking plate 132 of the reinforcement column 130 is provided to be smaller than a diameter of the locking space 112-1 of the first locking structure 112, and a diameter of the lower locking plate 134 is provided to be smaller than a diameter of the locking space 122-1 of the second locking structure 122.

Due to this reason, in a state when the upper locking plate 132 of the reinforcement column 130 is inserted into the locking space 112-1 of the first locking structure 112 of the upper fusing structure 110 and the lower locking plate 134 of the reinforcement column 130 is inserted into the locking space 122-1 in the second locking structure 122 of the lower fusing structure 120, as shown in FIG. 4, the upper and lower locking plates 132 and 134 each have no clearance in upward and downward directions, but have a clearance of about 2 to 5 mm provided in the horizontal direction, thereby being allowed to move.

Figure 5:
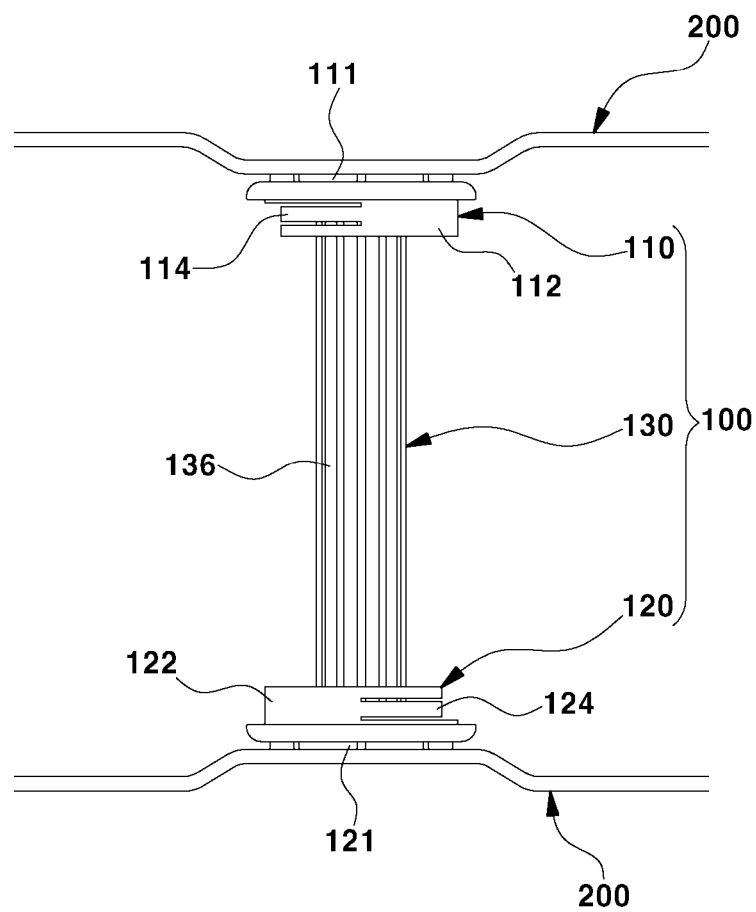
FIG. 5 is a sectional view showing a state where the stiffness reinforcement structure for the fuel tank of the vehicle is fused to the fuel tank.

In this manner, the upper locking plate 132 of the reinforcement column 130 is inserted into the locking space 112-1 in the first locking structure 112 of the upper fusing structure 110 and the lower locking plate 134 of the reinforcement column 130 is inserted into the locking space 122-1 in the second locking structure 122 of the lower fusing structure 120. Subsequently, the heat fusing projections 111 and 121 provided on the upper and under the lower fusing structures, 110 and 120, respectively, are heat fused to the inner top surface and the inner bottom surface, respectively, inside the fuel tank 200. When the heat fusing projections 111 and 121 are integrated with the fuel tank, assembling and installation of the reinforcement structure for the fuel tank of the present disclosure is completed as shown in FIG. 5.

Therefore, even though a pressure in a vertical direction is applied to the fuel tank 200, the reinforcement column 130 plays a role in supporting the pressure in the vertical direction, so that the fuel tank may be easily prevented from being vertically deformed.

Furthermore, even though a large impact in such as a collision is transferred to the fuel tank 200, because the upper locking plate 132 of the reinforcement column 130 is allowed to move in the locking space 112-1 of the first locking structure 112 and/or the lower locking plate 134 of the reinforcement column 130 is allowed to move in the locking space 122-1 of the second locking structure 122, the force due to the impact may be dispersed. As a result, the upper and lower fusing structures 110 and 120 become to prevent an excessive force due to the collision from being transferred to the portions that are heat fused on the ceiling surface (i.e., inner top surface) and bottom surface (i.e., inner bottom surface) inside the fuel tank 200 by the medium of the heat fusing protrusions 111 and 121.

In other words, even though the impact in such as the vehicle collision accident is applied to the fuel tank and the reinforcement column, the reinforcement column 130 may disperse and absorb the impact while moving in the locking spaces 112-1 and 122-1. Accordingly, the heat fused portions between the upper and lower fusing structures 110 and 120 and the fuel tank 200 may be maintained without rupture or deformation that may cause leakage.

Meanwhile, because the column portion 136 of the reinforcement column 130 is a part arranged vertically in the interior of the fuel tank and supporting the fuel tank, the column portion 136 may be manufactured in a structure capable of maintaining stiffness and reducing weight.

To this end, as shown in FIGS. 7A and 7B, the column portion 136 of the reinforcement column 130 may have a structure that has a plurality of vanes 136-2 radially arranged to and integrally provided with an outer surface portion of a hollow pipe 136-1.

Alternatively, the column portion 136 of the reinforcement column 130 may be manufactured in a structure having a plurality of grid-shaped cell spaces 136-3 in an inner portion thereof.

Although the present disclosure has been described in detail as one embodiment thereof, it is to be understood that the scope of the present disclosure is not limited to the above-described embodiment, but the embodiment may be modified and changed without departing from the scope of the present disclosure. Various modifications and improvements will also fall within the scope of the present disclosure provided the modifications and improvements come within the scope of the present disclosure.

What is claimed is:

1. A stiffness reinforcement structure for a fuel tank of a vehicle, the stiffness reinforcement structure comprising:
   a reinforcement column including an upper end part and a lower end part;
   an upper fusing structure including a first locking structure configured to lock the upper end part of the reinforcement column, the upper fusing structure configured to be fused on an inner top surface of the fuel tank; and
   a lower fusing structure including a second locking structure configured to lock the lower end part of the reinforcement column, the lower fusing structure configured to be fused on an inner bottom surface of the fuel tank;
   wherein the upper end part of the reinforcement column is removably inserted into and locked to the first locking structure, and the lower end part of the reinforcement column is removably inserted into and locked to the second locking structure,
   wherein the first locking structure is integrally provided at a lower side of the upper fusing structure, thereby providing a locking space where the upper end part of the reinforcement column is inserted in a horizontal direction and is provided with an opening at one side thereof, thereby allowing the reinforcement column to be accessed when assembled, and
   wherein a first locking lever is integrally provided at a part of a periphery of the first locking structure, thereby exerting an elastic restoring force to an original position when opened outward.

2. The stiffness reinforcement structure of claim 1, wherein one end of the first locking lever is integrally provided at a predetermined position of the periphery of the first locking structure, and an opposite end thereof is arranged as a free end in the opening of the first locking structure.

3. The stiffness reinforcement structure of claim 1, wherein the second locking structure is integrally provided at an upper side of the lower fusing structure, thereby providing a locking space where the lower end part of the reinforcement column is inserted in the horizontal direction and is provided with an opening at one side thereof, thereby allowing the reinforcement column to be accessed when assembled.

4. The stiffness reinforcement structure of claim 3, wherein a second locking lever is integrally provided at a part of a periphery of the second locking structure, thereby exerting an elastic restoring force to an original position when opened outward.

5. The stiffness reinforcement structure of claim 4, wherein one end of the second locking lever is integrally provided at a predetermined position of the periphery of the second locking structure, and an opposite end thereof is arranged as a free end in the opening of the second locking structure.

6. The stiffness reinforcement structure of claim 1, wherein, on a top surface of the upper fusing structure and under a bottom surface of the lower fusing structure, a plurality of heat fusing projections is integrally provided.

7. The stiffness reinforcement structure of claim 1, wherein the reinforcement column includes:
   a column portion having a predetermined length,
   an upper locking plate integrally provided on an upper end of the column portion and inserted into and locked to the locking space provided in the first locking structure, and
   a lower locking plate integrally provided on a lower end of the column portion and inserted into and locked to a locking space provided in the second locking structure.

8. The stiffness reinforcement structure of claim 7, wherein a diameter of the upper locking plate is provided to be smaller than a diameter of the locking space of the first locking structure, and a diameter of the lower locking plate is provided to be smaller than a diameter of the locking space of the second locking structure.

9. The stiffness reinforcement structure of claim 7, wherein the column portion of the reinforcement column forms a hollow pipe shape and includes a plurality of vanes which are arranged around and integrally provided on an outer surface portion of the column portion.

10. The stiffness reinforcement structure of claim 7, wherein the column portion of the reinforcement column is manufactured in a structure having a plurality of grid-shaped cell spaces in an inner portion thereof.

* * * * *